US006386083B1

(12) United States Patent
Hwang

(10) Patent No.: US 6,386,083 B1
(45) Date of Patent: May 14, 2002

(54) VERTICALLY MOVABLE FOAM SPONGE CUTTING APPARATUS

(76) Inventor: Ber-Fong Hwang, 10F, No. 200, Hin-Shan S. Rd.,., Taipei (TW)

(*) Notice: Subject to any disclaimer, the term of this patent is extended or adjusted under 35 U.S.C. 154(b) by 0 days.

(21) Appl. No.: 09/471,169

(22) Filed: Dec. 23, 1999

(51) Int. Cl.[7] .......................... B26D 1/48; B23D 53/04

(52) U.S. Cl. .......................... 83/788; 83/651.1; 83/789; 83/809; 83/820

(58) Field of Search .......................... 83/788, 801, 808, 83/809, 813, 820, 651.1

(56) References Cited

U.S. PATENT DOCUMENTS 2,654,404 A * 10/1953 Neuhauser et al. ........... 83/808
2,843,917 A * 7/1958 Crane et al. .................. 83/820
3,350,970 A * 11/1967 Glastra ........................ 83/820
3,800,650 A * 4/1974 Schroder ..................... 83/789
4,111,085 A * 9/1978 Johnson ....................... 83/801
4,683,791 A * 8/1987 Demont ..................... 83/651.1
4,903,682 A * 2/1990 Kurokawa ............... 125/16.01
4,915,000 A * 4/1990 MacFarlane ................. 83/820
5,213,022 A * 5/1993 Elgan .......................... 83/801
5,460,068 A * 10/1995 Gwosdz ....................... 83/808
5,806,401 A * 9/1998 Rajala et al. ................. 83/808
6,125,733 A * 10/2000 Hwang ........................ 83/820
6,199,468 B1 * 3/2001 Hackbarth et al. ............ 83/820

* cited by examiner

*Primary Examiner*—Kenneth E. Peterson
*Assistant Examiner*—Stephen Choi
(74) *Attorney, Agent, or Firm*—David E. Dougherty

(57) ABSTRACT

A vertically movable foam sponge cutting apparatus includes a vertical cutting device disposed on a blade strip frame. The vertical cutting device can be moved left and right in a vertical state. In addition, the vertical cutting device includes an ascending/descending device which is controllably movable up and down to change the rigidity of the blade strip in a cutting operation area. A foam sponge is cut along vertical cutting lines on a working bench. Therefore, a greater cutting function is achieved and the power consumption is lowered.

1 Claim, 10 Drawing Sheets

VERTICALLY MOVABLE FOAM SPONGE CUTTING APPARATUS

BACKGROUND OF THE INVENTION

The present invention relates to a vertically movable foam sponge cutting apparatus, and more particularly to a foam sponge cutting apparatus in which the blade strip can be kept in a vertical state when moved left and right. In addition, the interval of the working section of the blade strip can be adjusted. The foam sponge or the like can be cut into products with various irregular or curved shapes. The cutting operation is facilitated and stabilized.

In a conventional foam sponge cutting apparatus, the interval of the working section of the blade strip is constant. Consequently, when cutting a hard foam sponge, the blade strip tends to deflect and cause unplane cutting face. This is because the interval of the working section of the blade strip is too large and thus the rigidity of the blade strip is insufficient. Therefore, the blade strip may be resiliently deformed to lead to unplane cutting face. Moreover, the cutting speed is slowed down. In addition, in cutting, when it is desired to change the position of the vertical blade strip, it is necessary to drive a control mechanism to shift the large and heavy structure body. This wastes a great amount of power. Also, the blade strip replacing device includes a rotary handle for adjusting a guide wheel. It is laborious to operate such rotary handle.

SUMMARY OF THE INVENTION

It is therefore a primary object of the present invention to provide a vertically movable foam sponge cutting apparatus in which the blade strip can be moved left and right in a vertical state and the working bench is able to move the work piece so that the foam sponge can be cut into products with various irregular or curved shapes. Therefore, the cutting operation can be speeded to save cost.

It is a further object of the present invention to provide the above foam sponge cutting apparatus in which by means of an ascending/descending device, the interval of the working section of the vertical blade strip can be changed. Therefore, the cutting operation will not be deflected and the cutting operation is stabilized and the planarity of cutting face is enhanced.

It is still a further object of the present invention to provide the above foam sponge cutting apparatus in which by means of the pulley unit, transmission mechanisms and guide rails, the movement of the blade strip can be accomplished by reversely synchronously sliding only a few elements. Therefore, it is no more necessary to ascend or descend the entire blade strip frame body and thus the power consumption is lowered.

It is still a further object of the present invention to provide the above foam sponge cutting apparatus on which a horizontal cutting device can be mounted at the same time.

According to the above objects, the blade turning unit movement control mechanism makes the upper and lower seat bodies of the blade turning unit are respectively synchronously moved along the linear slide bars and the guide rails of the linear slide bar seats. The two pulleys disposed on the upper and lower linear slide bars are also synchronously moved along therewith to keep the working section of the blade strip moving left and right in a vertical state. In addition, an ascending/descending device is used to change the interval of the working section of the blade strip. The blade strip deflection rectifying mechanism is able to automatically detect and rectify the deflection of the blade strip. The working bench is reciprocally linearly moved back and forth and the positions of the foam sponge and blade strip on the plane are adjusted by means of numeral control so as to cut the foam sponge into products with various irregular or curved shapes. A driving member serves to push the guide wheel to loosen the blade strip for easy replacement thereof. Therefore, the vertical cutting operation is facilitated and stabilized and the power consumption is reduced and thus the cost is lowered.

The present invention can be best understood through the following description and accompanying drawings wherein:

DETAILED DESCRIPTION OF THE PREFERRED EMBODIMENTS

Figure 1:
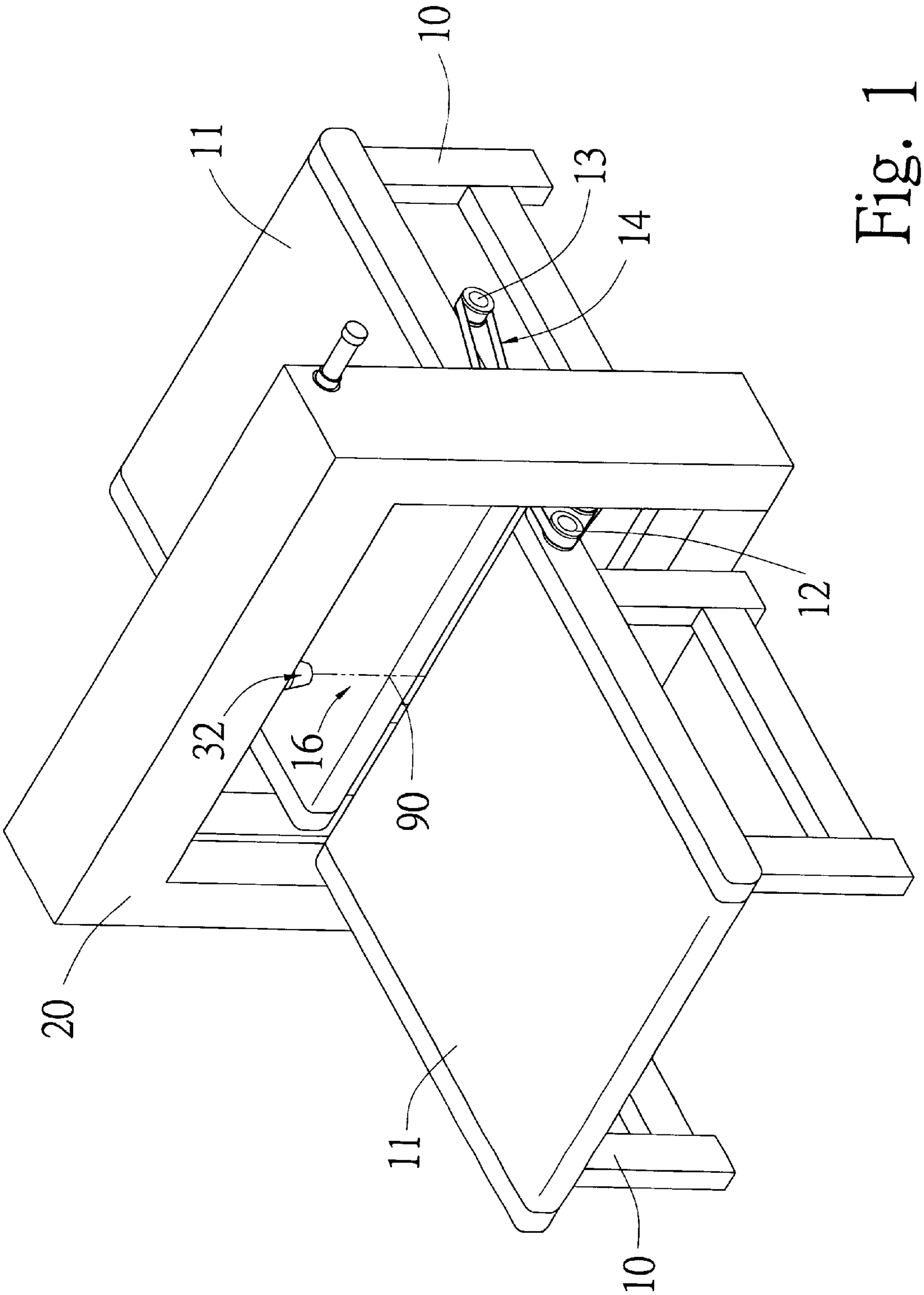
FIG. 1 is a perspective view of a first embodiment of the foam sponge cutting apparatus of the present invention.
Figure 2:
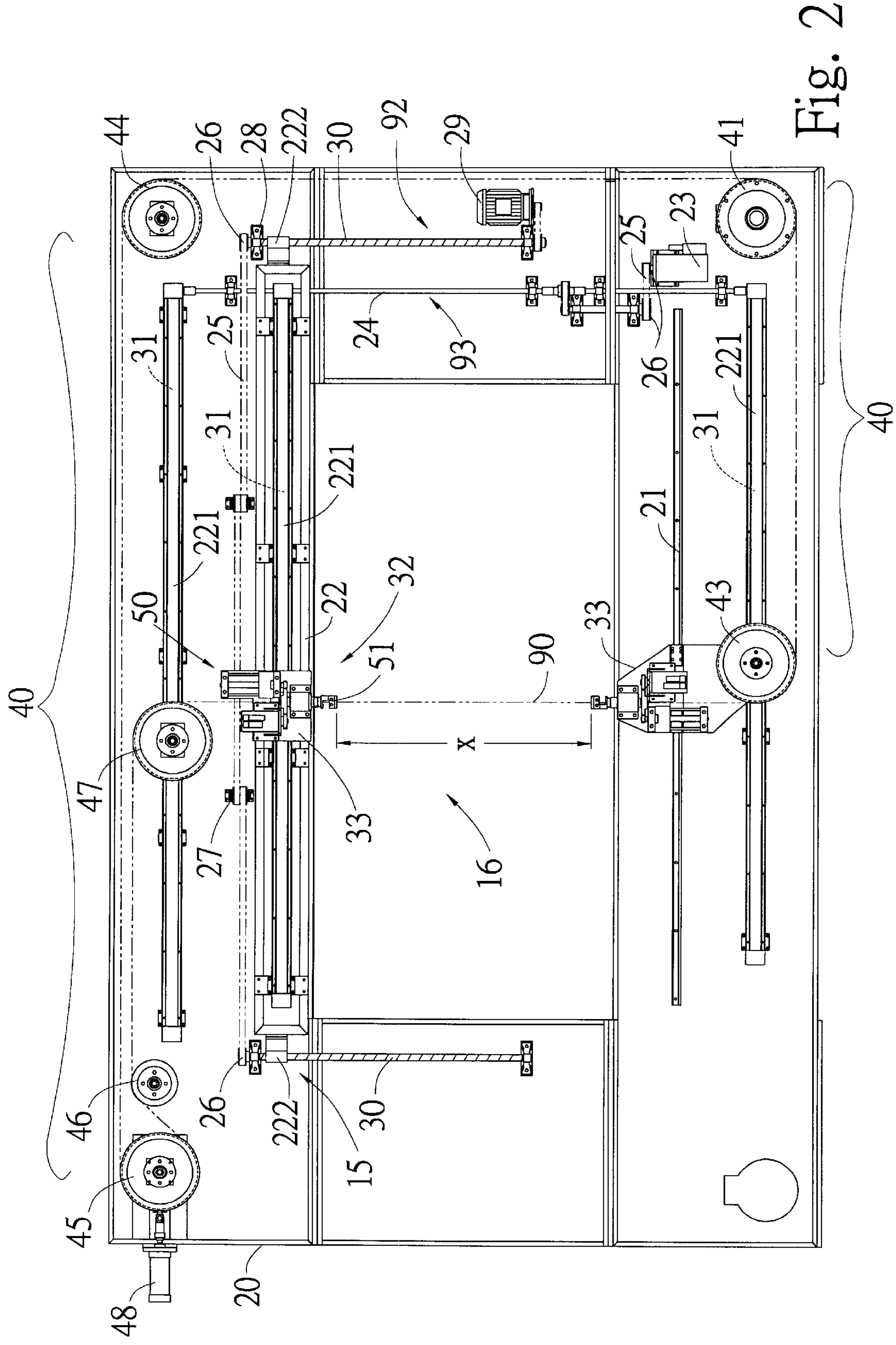
FIG. 2 is a front assembled view of the vertical blade strip structure of the present invention in which the cover of the blade strip frame is opened.
Figure 3:
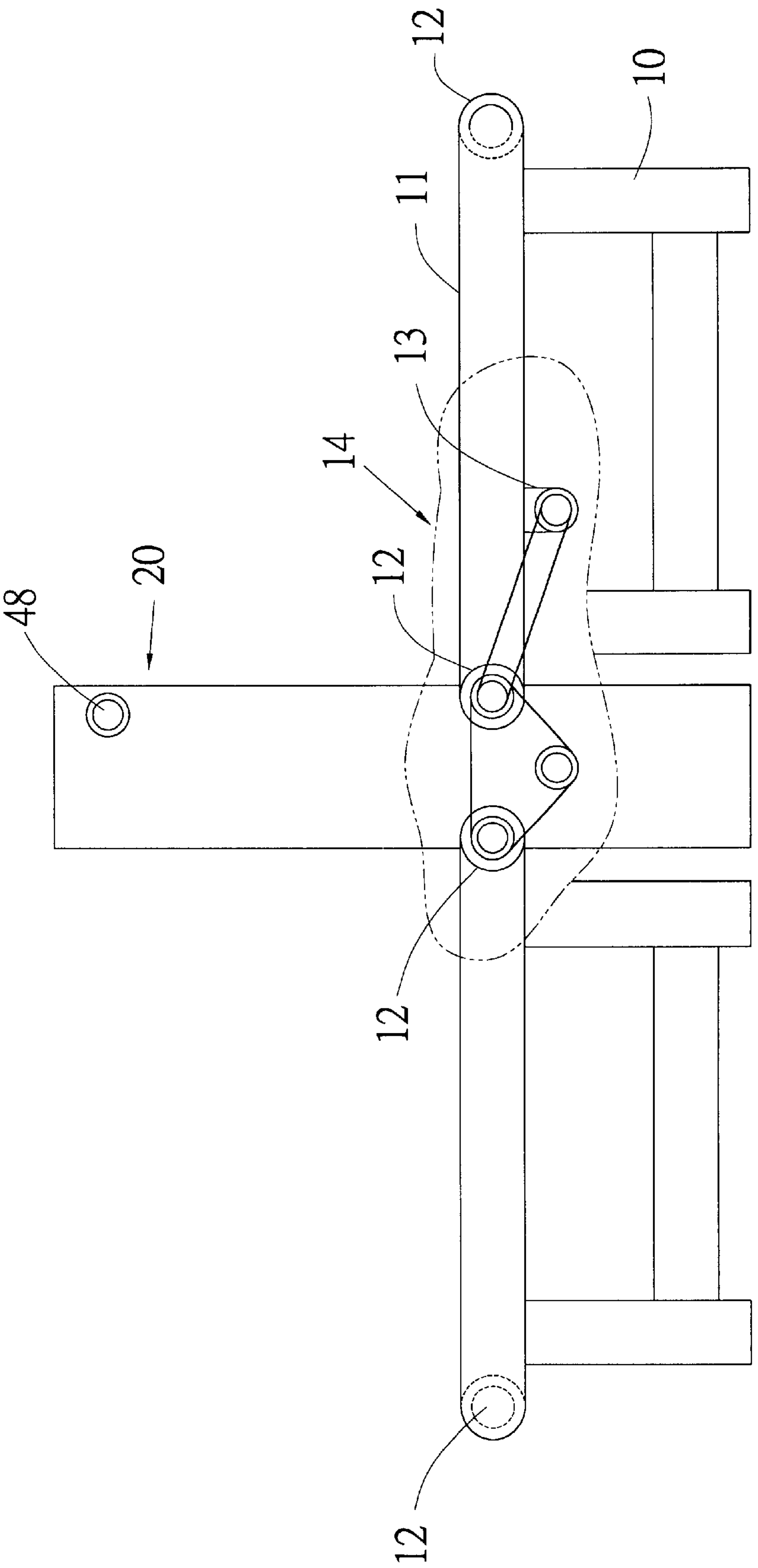
FIG. 3 is a side view of the working bench of the present invention.

Please refer to FIGS. 1 to 3. The present invention includes an apparatus body 10 and a blade strip frame 20. A working bench 11 is mounted on the apparatus body 10. A motor 13 is disposed under the working bench 11 and fitted with a toothed belt and wheel assembly 14. Two ends of each of the front and rear sections of the working bench 11 are disposed with roller shafts 12. The blade strip frame 20 is disposed with a vertical cutting device 16 (first embodiment). Each of the upper and lower beams of the vertical cutting device 16 is disposed with a linear slide bar 221. A thread rod 31 is underlaid on lower side of the slide bar 221. A guide rail 21 is disposed on upper side of slide bar 221 of the lower beam. The upper beam is disposed with a slide bar seat 22 the middle of which is a linear slide bar 221. A thread rod 31 is underlaid on lower side of the slide bar 221.

A blade turning unit 32 includes an upper and a lower blade seats. The upper blade seat is hung on the slide bar seat 22 and the lower blade seat is hung on the guide rail 21. The upper and lower blade seats are respectively connected with the slide bars 221.

Figure 4:
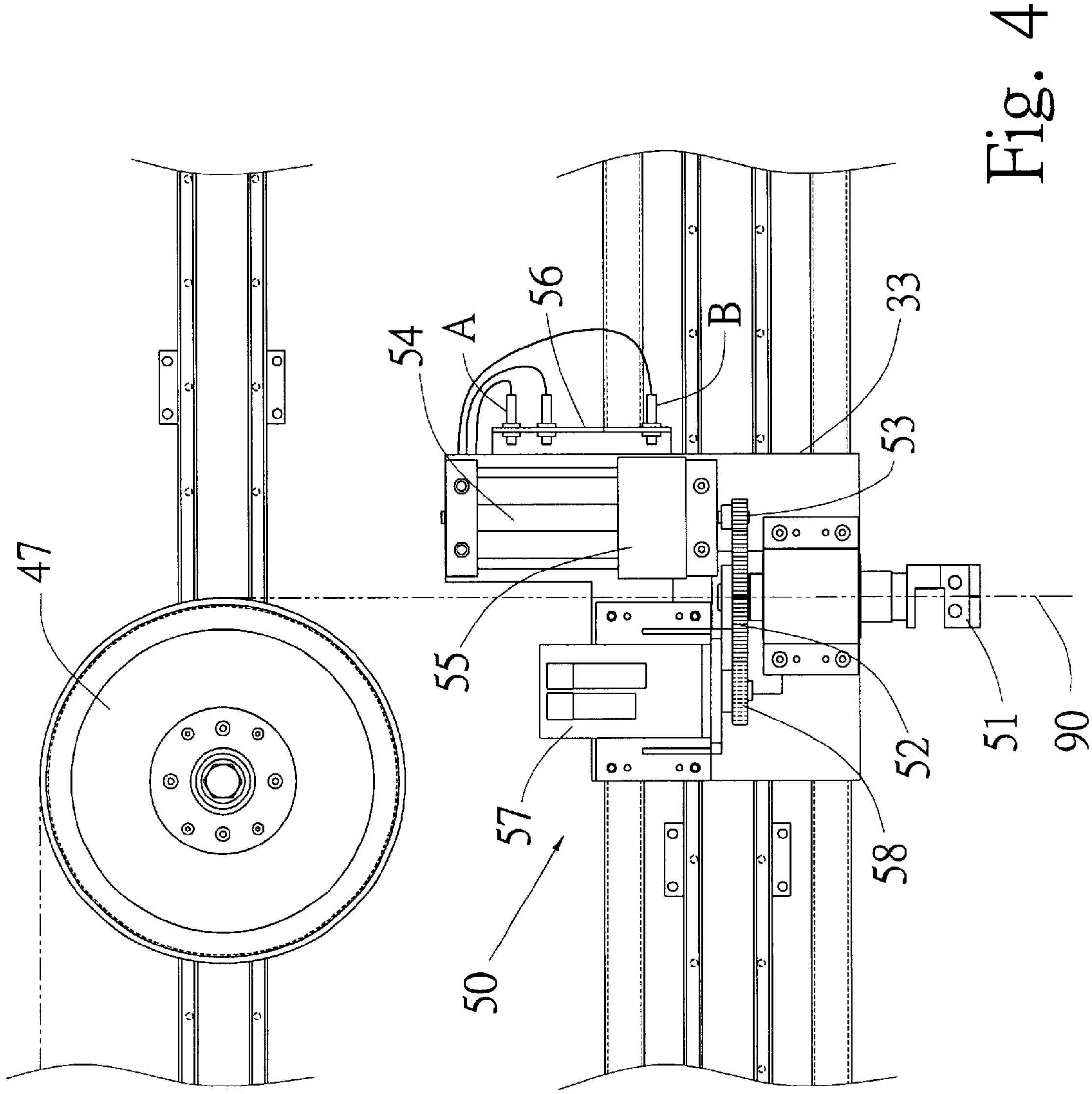
FIG. 4 is an enlarged view of the blade strip deflection rectifying mechanism of the present invention.
Figure 5:
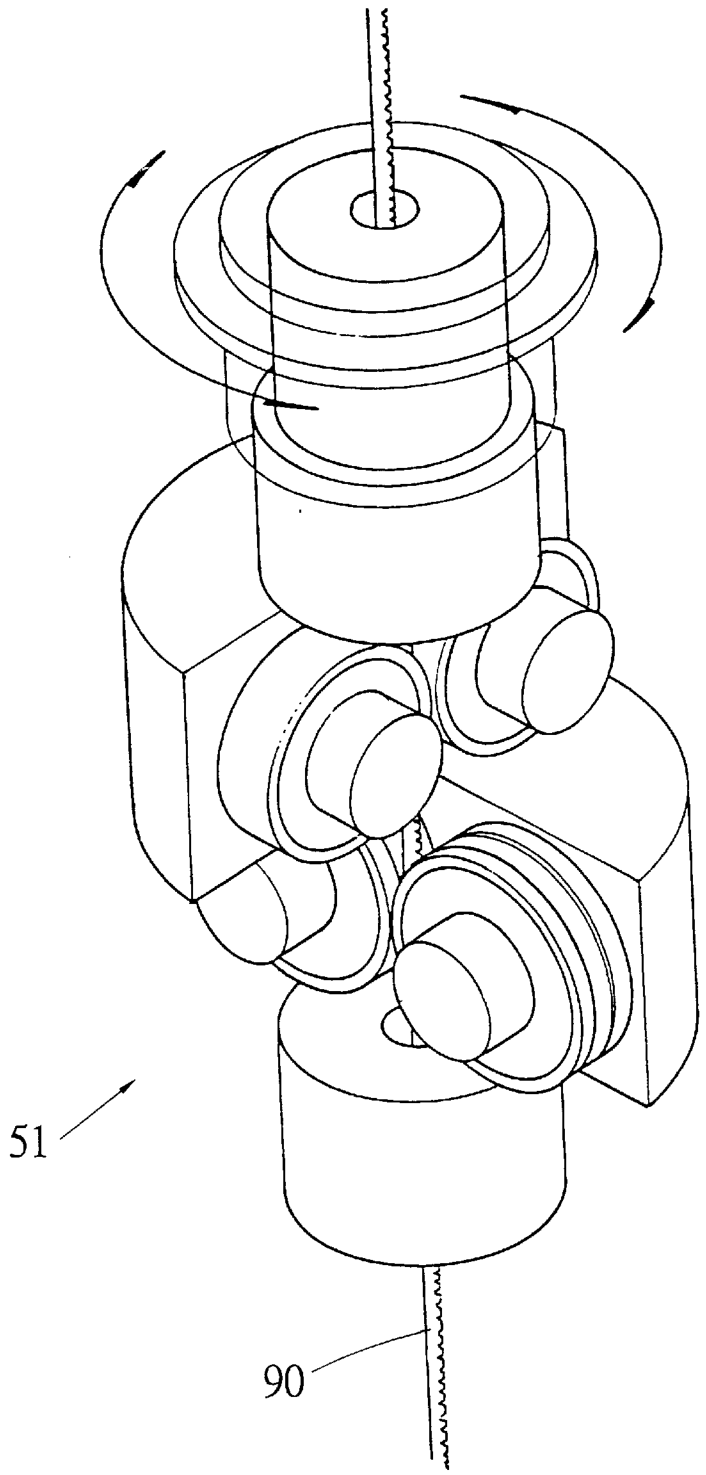
FIG. 5 is a perspective view of the blade strip deflection rectifying mechanism of the present invention.

Referring to FIGS. 2 and 4, a blade strip deflection rectifying mechanism 50 is disposed on the blade turning unit 32. The blade holder 51 at front end is integrally connected with a first positive gear 52 for clamping a blade strip 90. Two ends of the first positive gear 52 are respectively engaged with two positive gears 53, 58. A spiral rod 54 is engaged with upper side of the second positive gear 53 and a slide block 55 is disposed on the spiral rod 54. A detector unit 56 is positioned beside the slide block 55, including an upper detector A and a lower detector B. A third positive gear 58 is disposed at the output shaft of a servo-motor 57. As shown in FIGS. 4 and 5, when the blade face of the blade strip 90 is turned by a certain angle, the blade holder 51 is also turned by a certain angle to make the first positive gear 52 rotate and indirectly drive the adjacent second positive gear .53 and the spiral rod 54 to rotate. Accordingly, the slide block 55 is vertically moved. When the turning angle of the blade strip 90 is responsive of the vertical moving height of the slide block and exceeds the allowed limit of the upper detector A or lower detector B, the detector unit 56 will detect this and immediately activate the servo motor 57 to operate forward or backward in time for driving the third positive gear 58 to rotate and drive the first positive gear 52 to rotate. Accordingly, the blade holder 51 can carry the blade strip 90 and rectify the deflection to a correct angle. Therefore, the detector unit is a safety device for automatically sensing and automatically rectifying the deflection.

Referring to FIG. 2, a guide wheel unit 40 includes a driving wheel 41, two pulleys 43, 47 and three guide wheels 44, 45, 46. The driving wheel 41 is mounted on the lower beam of the blade strip frame 20 and connected with an output shaft of a motor. The lower blade seat pulley 43 is disposed under the lower blade seat of the blade turning unit 32 and positioned on the slide bar 221 and meshes with the thread rod 31 thereunder. The first and second guide wheels 44, 45 are mounted at two ends of the upper beam. The upper edges of the two wheels are adjacent to the tangential position. The third guide wheel 46 has a smaller diameter and is disposed beside the second guide wheel 45. The upper blade seat pulley 47 is disposed on the upper side of the slide bar 221 of the upper beam and meshes with the thread rod 31 thereunder. An oil cylinder 48 is horizontally disposed on outer side of the second guide wheel 45 and coupled therewith.

A blade strip 90 is wound over the driving wheel 41 and pulled upward to the first guide wheel 44. Then the blade strip 90 is tangentially pulled to the second guide wheel 45 and further pulled to the third guide wheel 46 and then to the upper blade seat pulley 47. The blade strip 90 vertically passes through the upper and lower blade seats and then is downward pulled to the lower blade seat pulley 43. Finally, the blade strip is pulled back to the driving wheel 41 to form a circularly close winding space. The blade strip 90 includes a vertical working section X and other sections forming the circularly winding space.

The blade turning unit 32 is controlled by a movement control mechanism 93. The output shaft end of a motor 23 via a toothed belt 25 and a toothed pulley 26 is coupled with a transmission shaft 24. The upper and lower ends of the transmission shaft 24 are respectively vertically connected with the slide bars 221 and mesh with the thread rods 31 thereunder.

The ascending/descending device 15 includes a driving mechanism 92 on which the linear slide bar seat 22 is fitted. The driving mechanism 92 is driven by another motor 29. The output shaft end of the other motor 29 via the toothed belt 25 and toothed pulley 26 is respectively coupled with a guide thread rod 30. The guide thread rod 30 is screwed with a nut 222 of the slide bar seat 22. The upper and lower ends of the guide thread rod are fitted with connecting rod bearing 28. The top end is disposed with a toothed pulley 26 to respectively connect with two idle wheels 27 via the toothed belt 25 and further connect with the toothed pulley 26 at the top end of the guide thread rod 30 on the other side.

The present invention is characterized in that when the motor 23 outputs rotational power, the toothed belt 25 and the toothed pulley 26 are fitted with each other to drive the transmission shaft 24 to rotate. By means of the thread rods 31 under the respective linear slide bars 221, the upper and lower seat bodies 33 of the blade turning unit 32 are respectively synchronously moved along the slide bar 221 and the guide rail 21 of the slide bar seats 22. The upper blade seat pulley 47 and the lower blade seat pulley 43 are also guided by the thread rods 31 and synchronously reversely moved along therewith to keep the working section X of the blade strip 90 moving left and right in a vertical state. The motor 29 synchronously drives the guide thread rods 30 on two sides, whereby the slide bar seat 22 ascends/descends via the nuts 222 at two ends so as to change the interval of the working section X of the blade strip 90.

When the motor drives the driving wheel 41 to rotate, the blade strip 90 is continuously revolved by means of the transmission of a guide wheel unit 40 so as to provide a cutting effect on the working bench 11.

A pneumatic cylinder 48 pushes and displaces the second guide wheel 45 to change the circularly close winding space of the blade strip so as to loosen the blade strip 90 for replacement thereof.

Figure 6:
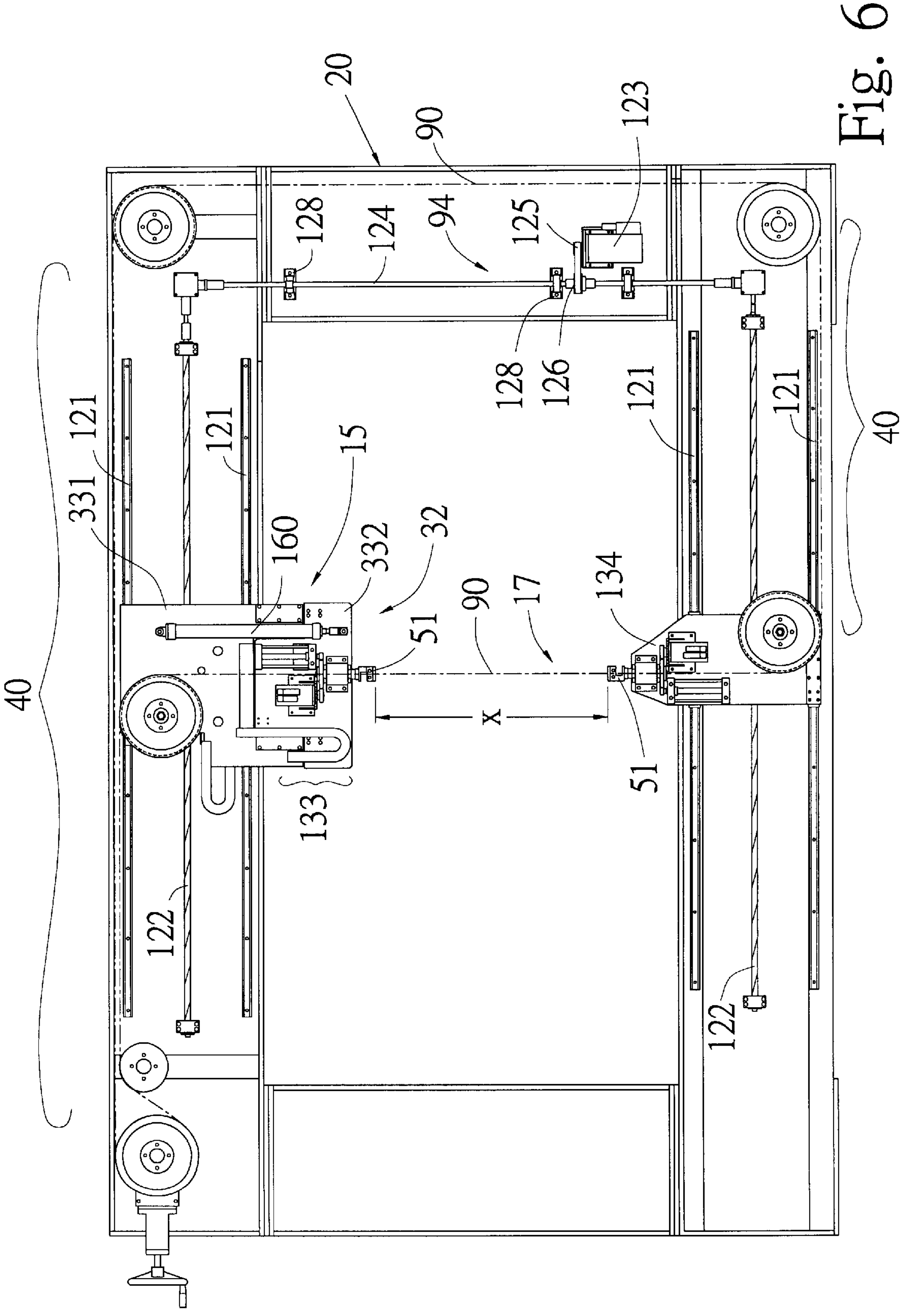
FIG. 6 is a front assembled view of a second embodiment of the vertical blade strip structure of the present invention in which the cover of the blade strip frame is opened.
Figure 7B:
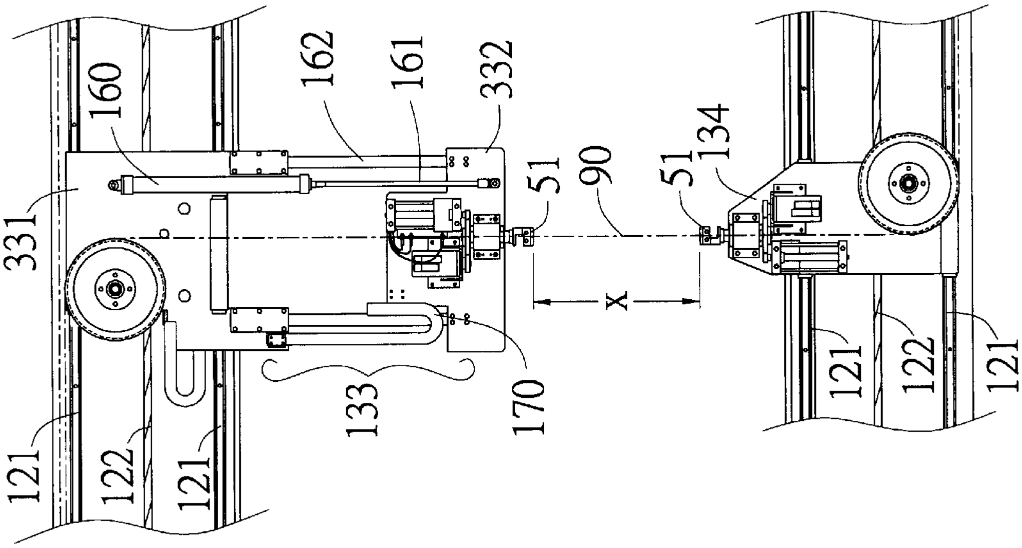
FIG. 7*b* shows the seat body of the second embodiment of the vertical cutting device of the present invention in a descended state.
Figure 7A:
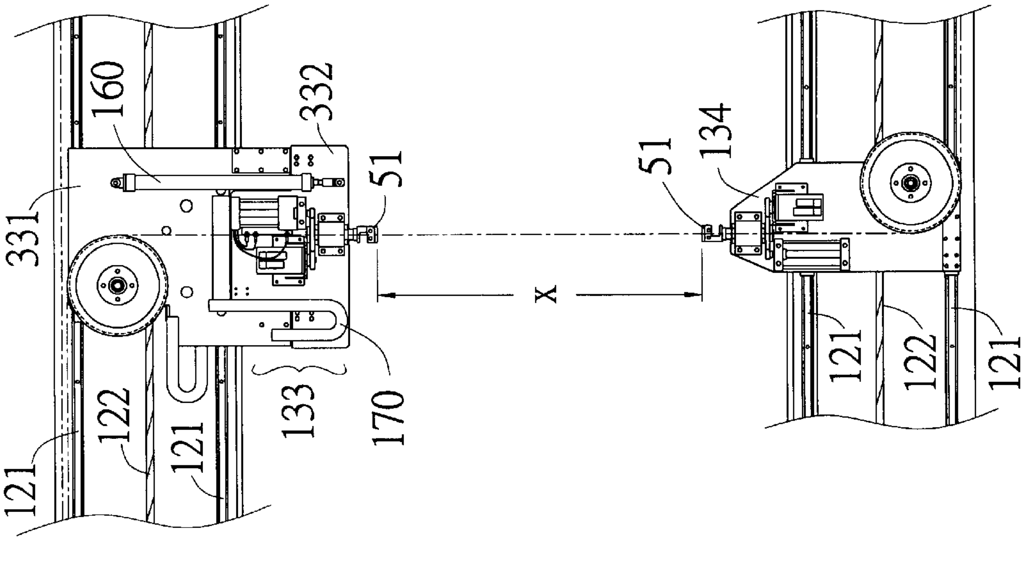
FIG. 7*a* shows the seat body of the second embodiment of the vertical cutting device of the present invention in a normal (not descended) state.

FIGS. 6, 7*a* and 7*b* show another embodiment of the vertical cutting device 17 of the present invention. The vertical cutting device 17 includes a blade turning unit movement control mechanism 94 including two guide rails 121 and a thread rod 122 disposed on each of the upper and lower beams. The output shaft end of a motor 123 via a toothed belt 125 and a toothed pulley 126 is coupled with a transmission shaft 124. The transmission shaft 124 is fitted with multiple connecting rod bearings 128. The upper and lower ends of the transmission shaft 124 are respectively vertically connected with the thread rods 122. The blade turning unit 32 includes an upper and a lower blade seats. The seat bodies 133, 134 of the upper and lower blade seats are respectively hung on the upper and lower guide rails 121 and connected with the thread rods 122. The blade strip 90 is wound on the guide wheel unit 40 to form a close winding line with a fixed length. The blade strip 90 includes a vertical working section X and other sections forming the circularly winding line, whereby the vertical cutting device 17 can be moved left and right with the blade strip kept vertical. The ascending/descending device 15 is such that a separable seat body 133 is hung on the guide rails 121 and the thread rod 122 disposed on the upper beam of the blade strip frame 20. The seat body 133 includes an upper seat section 331 at upper end and a lower seat section 332 at lower end. The upper seat section 331 is fixed with a front end of a pneumatic cylinder 160. The vertical lower seat section 332 is locked with an extensible stem 161 of rear end of the pneumatic cylinder 160. Two connecting rods 162 are screwed and fixed on two sides of the lower seat section 332 and vertically fitted with the upper seat section 331. An electric wire 170 is connected between the upper and lower seat sections, whereby the seat body 133 can ascend or descend to change the interval of the working section X of the blade strip.

In addition to the above vertical cutting device 16, the other side of the blade strip frame 20 can be disposed with a horizontal cutting device 18. The components of the horizontal cutting device are similar to those of the vertical cutting device 16, while the guide wheel unit is installed in altered direction. Therefore, one single cutting apparatus can provide both vertical and horizontal cutting functions.

Figure 8:
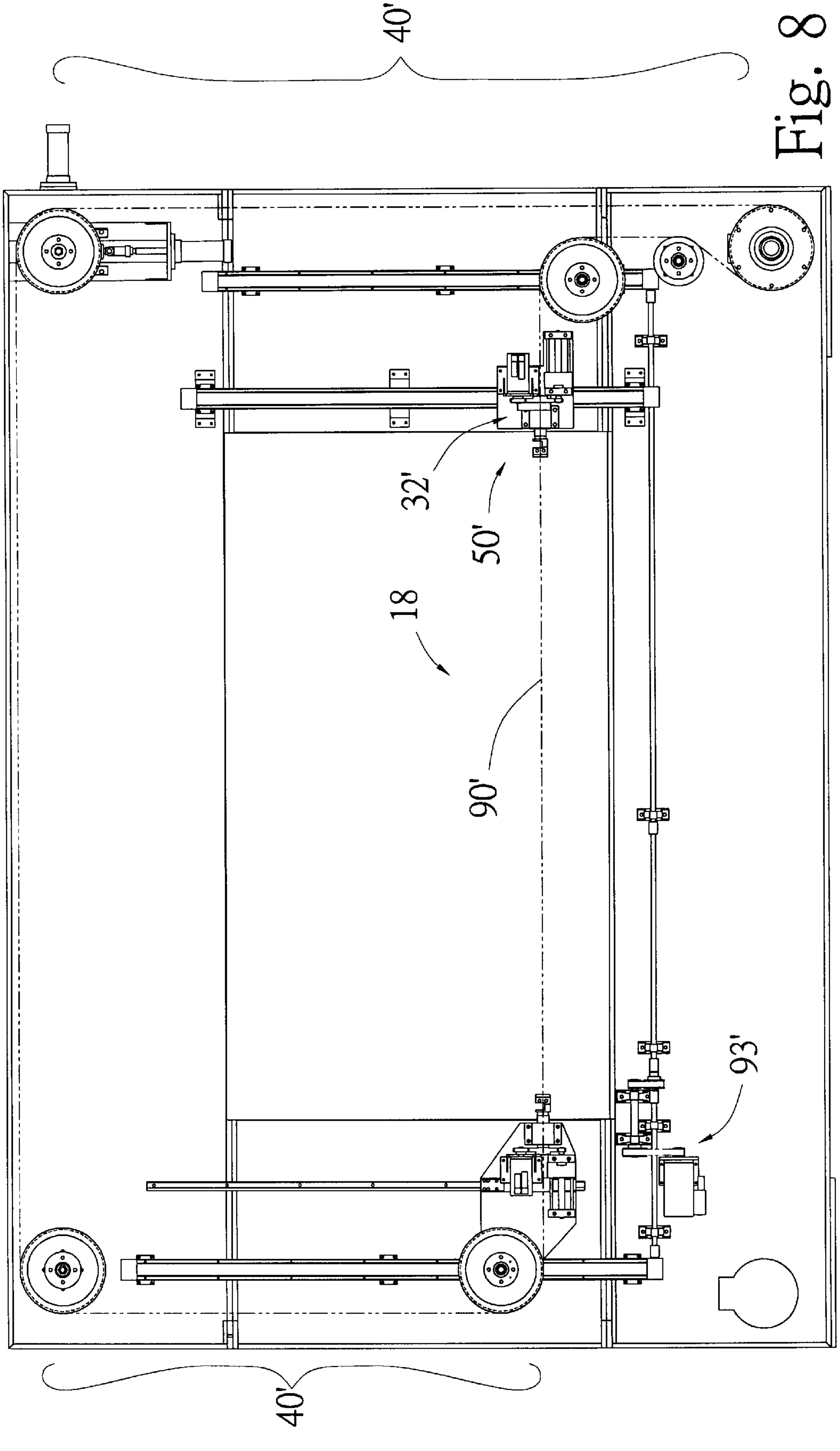
FIG. 8 is a front assembled view of the horizontal blade strip structure of the present invention, in which the cover of the blade strip frame is opened.

Referring to FIG. 8, the components of the guide wheel unit 40' of the horizontal cutting device 18 are identical to those of the aforesaid guide wheel unit 40. As shown in FIG. 2, the entire structure of the horizontal cutting device is alternatively arranged in a horizontal state, in which the blade strip 90' is horizontally positioned on the apparatus body 10. The blade turning unit 32', the blade strip deflection rectifying mechanism 50' and the blade turning unit movement control mechanism 93' of the horizontal cutting device are also identical to those of the vertical cutting device.

Figure 9:
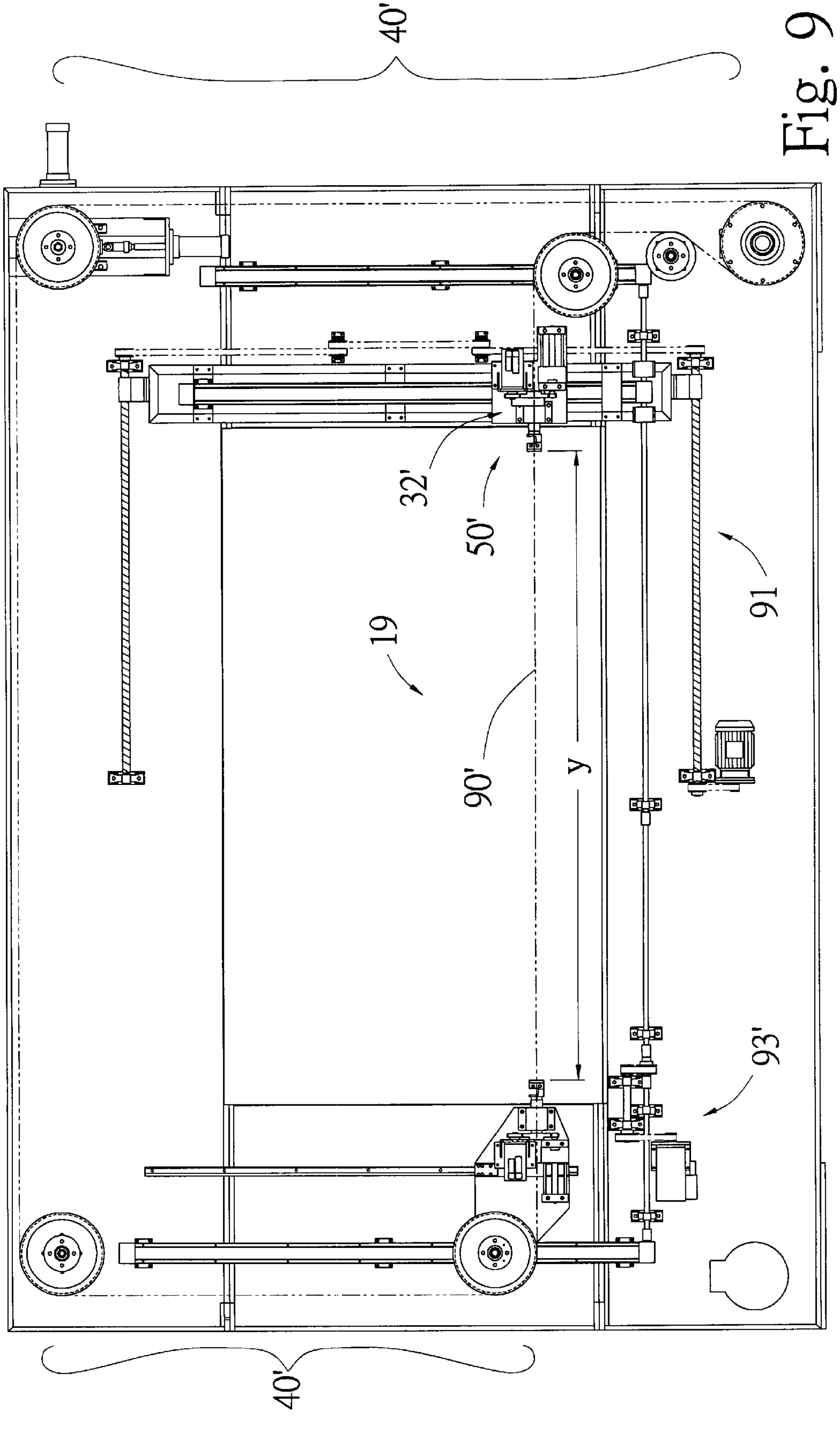
FIG. 9 is a front assembled view of the horizontal blade strip structure of the present invention, in which the cover of the blade strip frame is opened and the horizontal cutting device includes an extensible driving device.

Referring to FIG. 9, the components of the horizontal cutting device 18 can be identical to those of the aforesaid vertical cutting device 16, including an extensible driving device 91, while being arranged in altered direction to form a horizontal cutting device 19 in which the interval of the working section Y of the blade strip is changeable.

Figure 10:
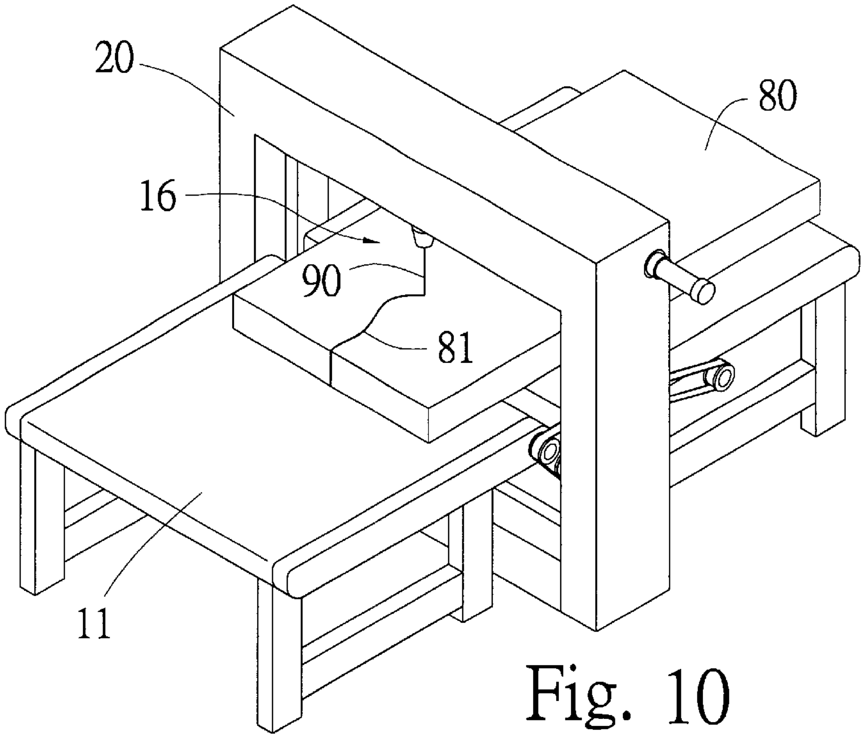
FIG. 10 shows the application of the present invention in one state.

Referring to FIG. 10, in use for vertically cutting operation, the foam sponge 80 is placed on the working bench 11 and then the vertical cutting device 16 (or 17) is activated. The working bench is reciprocally linearly moved back and forth so as to cut the foam sponge along various irregular or curved cutting line 81 in vertical direction. The travel of the blade strip 90 depends on the change of the position of the wheels of the guide wheel unit 40, whereby the driving power consumption is reduced so that the present invention can be easily and conveniently operated and is able to achieve a stable cutting effect. Therefore, the power consumption is reduced and the cost is lowered.

Figure 11:
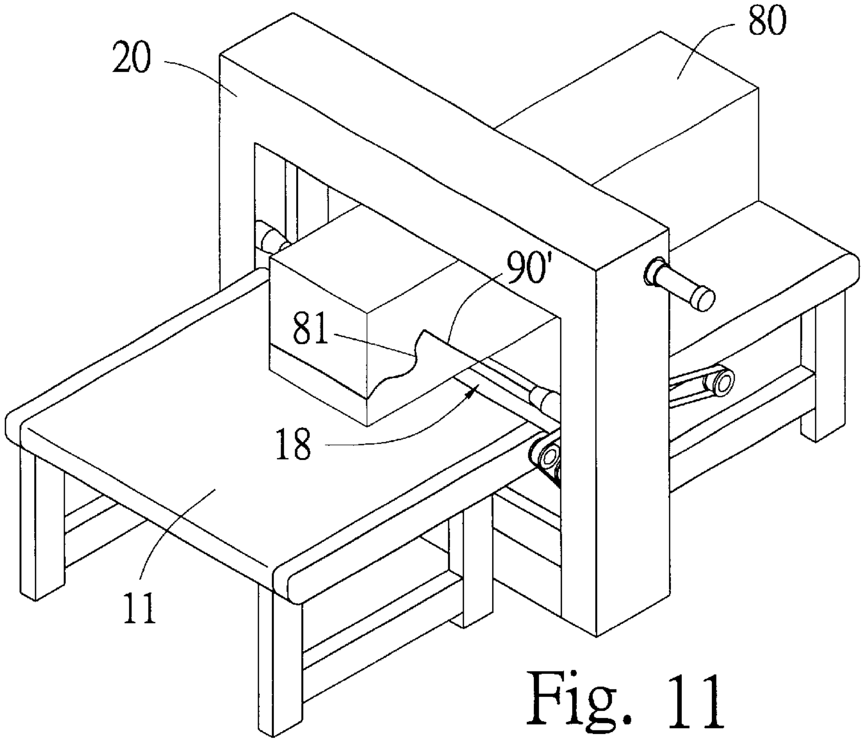
FIG. 11 shows the application of the present invention in another state.

Referring to FIG. 11, in use for horizontally cutting operation, the foam sponge 80 is placed on the working bench 11 and then the horizontal cutting device 18 (or 19) is activated to similarly cut the foam sponge along various irregular or curved cutting line in horizontal direction. Therefore, both vertical and horizontal cutting can be performed on one single working bench. This reduces the room occupied by the equipment and indirectly lowers the cost.

However, since the vertical and horizontal cutting devices co-use the working bench, when using the vertical cutting device 16 (or 17), the horizontal cutting device 18 (or 19) should be shifted to the rear end of the travel to ensure safety.

According to the above arrangement, the present invention has the following advantages:

1. The ascending/descending device of the present invention serves to change the interval of the working section of the blade strip. When the interval is shortened, the cutting operation will not be deflected so that the cutting operation is stabilized and the planarity of cutting face is enhanced.
2. By means of the pulley unit, linear slide bars and guide rails, the shifting and changing of the interval of the blade strip can be accomplished only by sliding of a few elements so that the power consumption is reduced and the working cost is lowered.
3. The pneumatic cylinder serves to push the guide wheel to loosen the blade strip for easy replacement thereof.
4. The guide thread rod is fitted with connecting rod bearing so that the guide thread rod will not swing due to excessive length and the stability is enhanced.
5. One single apparatus includes both vertical and horizontal cutting devices so that the apparatus can be very conveniently used.

The above embodiments are only used to illustrate the present invention, not intended to limit the scope thereof. Many modifications of the above embodiments can be made without departing from the spirit of the present invention.

What is claimed is:

1. A vertically movable foam sponge cutting apparatus comprising an apparatus body having a front face, a blade strip frame including upper and lower beams, a blade strip, a guide wheel unit and a blade turning unit wherein:

a working bench is mounted on said front face of said apparatus body;

said blade strip frame bridged over said apparatus body and a blade turning unit movement control mechanism disposed between said upper and said lower beams;

said blade turning unit including upper and lower blade seats each of which has a seat body, transmission mechanism and blade holder; and said guide wheel unit including a driving wheel and multiple wheels disposed on said upper beam of said blade strip frame and said two seat bodies of said blade turning unit fixing said blade strip for cutting operation, and a pulley disposed on each of said seat bodies and said blade strip wound on said guide wheel unit and pulled and conducted to form a close winding line with a fixed length including a vertical working section of the blade strip, said foam cutting apparatus being characterized in that an ascending/descending device is disposed between said upper and lower beams of said blade strip frame and associated with said blade turning unit movement control mechanism for changing the interval of the working section of said blade strip; and wherein said ascending/descending device includes a linear slide bar seat fitted on a driving mechanism, a slide bar seat being connected with the blade turning unit movement control mechanism, whereby the blade seat hung on the slide bar seat can be ascended or descended along with the slide bar seat and wherein said ascending/descending device includes a pair of internally threaded elements and a pair of guide threaded rods extending through said internally threaded elements, and a motor for synchronously driving said guide threaded rods to thereby change the interval of the working section of the blade strip.

* * * * *